Nov. 30, 1965   D. B. DEEKS   3,220,650
STEAM TRAP
Filed Dec. 30, 1963

INVENTOR
DOUGLAS B. DEEKS
BY- Featherstonhaugh & Co.
ATTORNEYS

United States Patent Office 3,220,650
Patented Nov. 30, 1965

3,220,650
STEAM TRAP
Douglas B. Deeks, 197 Forest Hill Road, Toronto,
Ontario, Canada
Filed Dec. 30, 1963, Ser. No. 334,159
1 Claim. (Cl. 236—59)

This invention relates to a steam trap adapted to discharge condensation water from a steam line.

Steam traps which use a bimetallic element to open and close a valve with respect to a valve seat to rid the trap of condensate as the need arises are well known. It is also well known to employ bimetallic elements arranged in a series on the valve stem to operate the valve with respect to the valve seat for the purposes of the device. Such a device, for example, is generally illustrated in United States Patent No. 2,912,166 to Dominick.

With the devices of the prior art the bimetallic elements are of the creep type, that is they are normally flat and gradually assume a curvature as they are heated, with the result that the valve is gradually closed and opened in response to the line conditions. Under some conditions of operation the seating of the valve is often almost closed for extended periods and "wire drawing" of the valve seat occurs with the result that the valve will not thereafter properly close. Additionally the gradual operation towards the open and closed position tends to result in undue steam loss. This invention employs a type of bimetallic element specially arranged to achieve a sensitive positive snap action opening and closing of the valve on the valve seat that avoids a condition that will result in wire drawing and in addition gives protection against undue steam loss.

Generally speaking, a steam trap according to this invention uses a series of dished bimetallic elements in face to face relation operably connected to the valve stem to fluctuate the valve between open and closed positions. The dished bimetallic elements are adapted to move with a snap action from an inoperative position to an operative position upon the attainment of predetermined temperature pressure relationship in the trap. The construction provides for a fast positive opening and closing of the valve, and the invention will be clearly understood after reference to the following detailed specification read in conjunction with the accompanying drawings.

Figure 1:
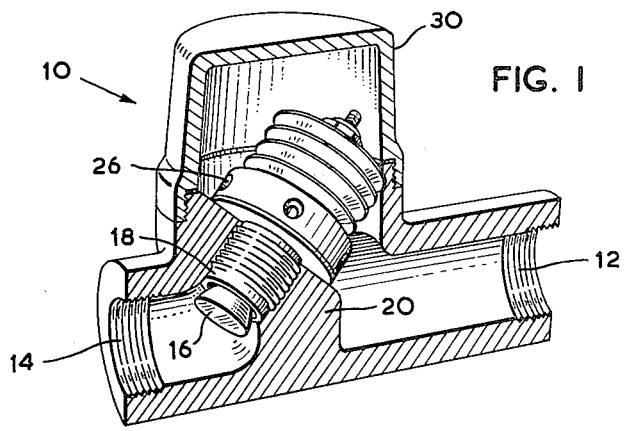
FIGURE 1 is a cut-away view of a steam trap according to this invention.

Referring to the drawings, the numeral 10 generally refers to a steam trap. It has a housing with an inlet 12 and an outlet 14. A valve 16 is adapted to seal on the valve seat 18 and to move between an open position, shown in FIGURE 2, and a closed position, shown in FIGURE 3, to open and close the through opening provided by the valve assembly in the partition wall 20 of the steam trap housing.

The general construction of the valve assembly is old and comprises a valve seat 18 that communicates with a through bore 22 and a valve 16 having a stem 24 that extends through the bore. Radially extending holes 26 bored in the head of the valve assembly communicate with the through bore 22. The threaded shank of the valve assembly threads into the partition wall 20 of the trap housing, and the chamber which houses the valve actuating means is separately formed as a cap 30 and threaded onto the main portion of the housing.

The novelty of this invention resides in the means for opening and closing the valve, and in this respect there are provided a series of dished bimetallic elements arranged in pairs 32 and 34, 36 and 38, 40 and 42, and 44 and 46 on the valve stem 24 in face-to-face relation to operate the valve. These elements are of generally known design and are adapted to move with a snap action to change the direction of their dished characteristics upon the attainment of a predetermined temperature. These elements have been symbolically indicated as metal in the drawings but it will be appreciated that they include metal of two types in accordance with standard bimetal element practice.

By the employment of spacers 52 on each side of pairs of bimetallic elements, this snap action characteristic can be utilized to give a sharp positive closure of valve 16 against its seat on the attainment of a predetermined temperature pressure relationship in the chamber.

Figure 2:
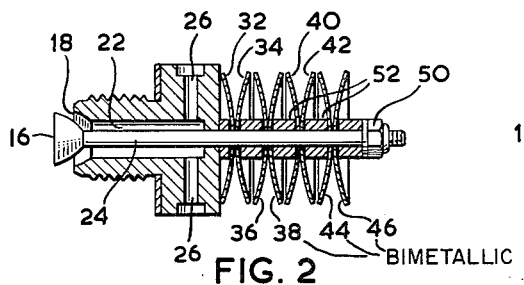
FIGURE 2 is a sectional view of the valve seat and valve with the valve open.
Figure 3:
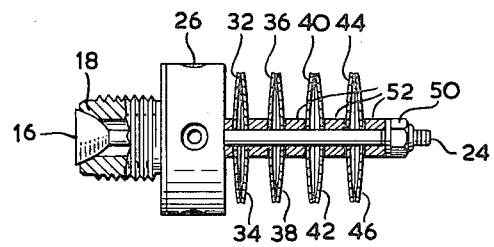
FIGURE 3 is a view similar to FIGURE 2, but showing the valve closed.

Spacers 52 are arranged such that when the bimetallic elements are actuated from an inoperative position, shown in FIGURE 2, in which the edge portions thereof partially overtie the spacers 52, to an operative position, shown in FIGURE 3, they function to cause the edge portions of each pair of the bimetallic elements to react against each other to extend the length of the series and carry the valve 16 to a closed position as they exert their expanding force against the pressure of the line between the valve seat 18 and the nut 50 on the end of the valve stem 24. It will be apparent that the force of the closure can be adjusted by adjustment of nut 50 on stem 24. In their operative position of FIGURE 3 the bimetallic elements are restrained from flexing their full extent due to the adjustment of nut 24 longitudinally of stem 24 to achieve the desired valve closure pressure.

Figure 4:
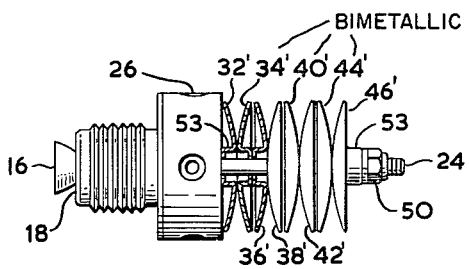
FIGURE 4 is a partially sectional view of an alternative form of valve seat and valve with the valve open.
Figure 5:
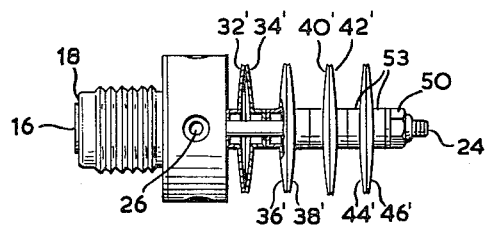
FIGURE 5 is a view similar to FIGURE 4 but showing the valve closed.

FIGURES 4 and 5 illustrate a similar valve assembly but with an alternative bimetallic element construction. In this case the spacer means is a part of the dished bimetallic elements 32′ and 34′, 40′ and 42′, and 44′ and 46′ and comprises an inturned annular portion adjacent their centres. It will be apparent that heat conduction from bimetal to bimetal at the spacer section is increased and they are thus more sensitive to steam and condensate temperature changes. This particular embodiment of the invention also has advantage from the assembly point of view because the bimetallic elements can easily, by reason of their shape, be correctly placed on the valve stem. It also involves less parts because there are no separate spacers.

In use the trap is connected in a steam line with the inlet end 12 in communication with the steam pressure. The bimetallic elements are designed such that the temperature of the steam in the line will normally cause the bimetallic elements to flex to an operative position, as illustrated in FIGURES 3 and 5, against the pressure of the steam in the line. The nut 50 is adjusted so that the marginal edges of the bimetallic elements react against each other with considerable force to achieve a tight closure of the valve 16 on its seat 18. The closure can be loosened by turning the nut towards the end of the valve stem and tightened by turning the nut away from the end of the valve stem. As condensate collects in the trap and adjacent the bimetallic elements, the temperature on the bimetallic elements is lowered. When the temperature reaches a predetermined point, the elements flex with a snap action to an inoperative position, as illustrated in FIGURES 2 and 4, to permit the valve 16 to open in response to the line pressure and to permit the water condensate to be discharged out of the opening 14. Due to slight differences in bimetal elements the pairs will operate at slight time intervals but it will be a quick step action. As the condensate is discharged, steam at a higher temperature than the condensate approaches the bimetallic elements, and they flex again together or in very rapid succession to assume the positions illustrated in FIGURES 3 and 5 to close the valve.

The general operation of the unit is well known and need not be referred to further in this specification. The novelty of the invention is, as indicated above, the employment of a dished bimetallic element that will flex with a snap action from one position to another in combination with appropriate spacer means.

What I claim as my invention is:

A steam trap comprising: a housing having an inlet and an outlet; a barrier in said housing between said inlet and outlet; a through opening in said barrier formed with a valve seat; a valve adapted to seat on said valve seat and adapted to move between an open and a closed position whereby communication between said inlet and outlet can be made and broken; said valve having a valve stem; means including a series of dished bimetallic elements in face-to-face relation operably connected to said valve stem to actuate said valve between said open and closed positions; said dished bimetallic elements being disposed to contact steam in said trap and adapted to move with a snap action from an inoperative position in which they are dished in one direction to an operative position in which they are dished in the opposite direction upon the attainment of predetermined temperature pressure relationship in said trap, said dished bemetallic elements being arranged in pairs; said dished bimetallic elements being restrained whereby the marginal edge portions of adjacent dished bimetallic elements in each pair of said series are adapted to react against each other when they are in said operative position, and spacer means for maintaining adjacent pairs of said dished bimetallic elements in spaced relation when they are in said operative condition; said spacer means comprising an annular offset metal portion at the inner edge of each of said dished bimetallic elements; the marginal edge portion of said dished bimetallic elements overlying at least a portion of said spacer means when said dished bimetallic elements are in an inoperative position whereby said series of dished bimetallic elements has a geater length when in said operative position than in said inoperative position; said variation in length of said series of discs being adapted to actuate said valve between said open and said closed positions as aforesaid.

References Cited by the Examiner

UNITED STATES PATENTS

| | | | |
|---|---|---|---|
| 1,656,392 | 1/1928 | Russell et al. | 236—59 |
| 2,194,771 | 3/1940 | Semon et al. | 236—93 |
| 3,042,363 | 7/1962 | Deeks | 236—59 X |

ALDEN D. STEWART, *Primary Examiner.*